United States Patent
Singh et al.

(10) Patent No.: US 9,346,228 B2
(45) Date of Patent: May 24, 2016

(54) SEGMENTED MOLD OPERATOR

(71) Applicant: McNeil & NRM, Inc., Akron, OH (US)

(72) Inventors: Anand Pal Singh, Akron, OH (US); Daniel Zaklanovich, Tallmadge, OH (US)

(73) Assignee: MCNEIL & NRM, INC., Akron, OH (US)

( * ) Notice: Subject to any disclaimer, the term of this patent is extended or adjusted under 35 U.S.C. 154(b) by 142 days.

(21) Appl. No.: 14/326,592

(22) Filed: Jul. 9, 2014

(65) Prior Publication Data

US 2016/0009040 A1    Jan. 14, 2016

(51) Int. Cl.
*B29D 30/06* (2006.01)
*B29K 105/24* (2006.01)

(52) U.S. Cl.
CPC ........ *B29D 30/0605* (2013.01); *B29D 30/0606* (2013.01); *B29D 30/0629* (2013.01); *B29K 2105/246* (2013.01)

(58) Field of Classification Search
CPC .................. B29D 30/0606; B29D 30/0629
USPC ............................................. 425/28.1, 46, 47
See application file for complete search history.

(56) References Cited

U.S. PATENT DOCUMENTS

| | | | |
|---|---|---|---|
| 3,817,670 A * | 6/1974 | Leblond | B29D 30/0605 425/39 |
| 3,918,861 A | 11/1975 | Klose | |
| 4,289,463 A | 9/1981 | Le Moullac | |
| 4,647,273 A | 3/1987 | Singh et al. | |
| 5,316,458 A | 5/1994 | Lesneski | |
| 5,589,200 A * | 12/1996 | Irie | B29C 33/202 425/46 |
| 5,676,980 A | 10/1997 | Gulka et al. | |
| 5,681,594 A | 10/1997 | Irie | |
| 5,690,970 A * | 11/1997 | Irie | B29D 30/0662 425/46 |
| 5,773,041 A | 6/1998 | Singh et al. | |
| 6,506,040 B1 | 1/2003 | Singh | |
| 6,733,712 B2 | 5/2004 | Yu | |
| 7,371,060 B2 * | 5/2008 | Ichimaru | B29D 30/0629 425/195 |
| 8,366,426 B2 | 2/2013 | Singh et al. | |
| 2004/0032057 A1 | 2/2004 | Cole | |

OTHER PUBLICATIONS

U.S. Appl. No. 14/028,800, filed Sep. 17, 2013; Not yet published.
European Patent Office; Extended European Search Report; Applicant McNeil & NRM, Inc.; Application No. EP 15 17 5483; Place of Search: Munich; Date of Completion of Search: Dec. 1, 2015.

* cited by examiner

*Primary Examiner* — James Mackey
(74) *Attorney, Agent, or Firm* — Pearne & Gordon LLP

(57) ABSTRACT

A segmented mold operator includes a main frame fixed to an upper cavity part of a tire press cavity and a control plunger with an axially movable cylinder rod that is configured to apply a squeeze pressure to the tire press cavity. A rotatable lock ring is rotatably coupled about an end of the cylinder rod and axially movable therewith. The lock ring includes a plurality of teeth radially arranged thereon to interface with a mold ring adapter via a bayonet connection. A lock ring frame is independent from the rotatable lock ring and is separated therefrom along the cylinder rod. A locking plunger is configured to selectively engage the rotatable lock ring to thereby prevent rotation of the rotatable lock ring. An electronic lock sensor is configured to electronically sense an axial position of the lock rod.

20 Claims, 16 Drawing Sheets

SEGMENTED MOLD OPERATOR

CROSS-REFERENCE TO RELATED APPLICATIONS

Not Applicable.

FIELD OF THE INVENTION

The present invention relates generally to tire manufacturing, and more particularly, to a segmented mold operator for a tire curing press.

BACKGROUND OF THE INVENTION

Present day tire curing is accomplished by a tire curing press that shapes and cures the green or uncured tire carcass and then discharges the cured tire usually on a conveyor at the rear of the press. Additionally, it has been common to employ tire curing presses in a number of sizes to accommodate the large variety of pneumatic tire sizes required for vehicles of different sizes, weights and performance characteristics. As a result, tire curing presses of different sizes are commonly manufactured for passenger tire, large passenger tire, small truck tire and truck tire applications. Finally, since tire shaping and curing operations are carried out at high pressures, tire curing presses are constructed of heavy steel members which can both manipulate the tire molds during press opening and closing, and also provide the requisite squeeze pressure to withstand the internal pressures encountered during the tire curing operation.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the instant application, a segmented mold operator includes a main frame fixed to an upper cavity part of a tire press cavity and a control plunger with an axially movable cylinder rod that is configured to apply a squeeze pressure to the tire press cavity. A lock ring frame is coupled to the cylinder rod and axially movable therewith. A rotatable lock ring is rotatably coupled about an end of the cylinder rod and axially movable therewith. The lock ring includes a plurality of teeth radially arranged thereon to interface with a mold ring adapter via a bayonet connection. The lock ring frame is independent from the rotatable lock ring and is separated therefrom along the cylinder rod.

In accordance with another aspect of the instant application, a segmented mold operator includes a main frame fixed to an upper cavity part of a tire press cavity, and a control plunger with an axially movable cylinder rod that is configured to apply a squeeze pressure to the tire press cavity. A rotatable lock ring is rotatably coupled about an end of the cylinder rod and is axially movable therewith. The rotatable lock ring is configured to rotatably interface with a mold ring adapter. A locking plunger includes a lock rod that is axially movable with respect to the rotatable lock ring. The locking plunger is configured to selectively engage the rotatable lock ring to thereby prevent rotation of the rotatable lock ring. An electronic lock sensor is disposed at an upper portion of the locking plunger that is configured to electronically sense an axial position of the lock rod relative to the locking plunger.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
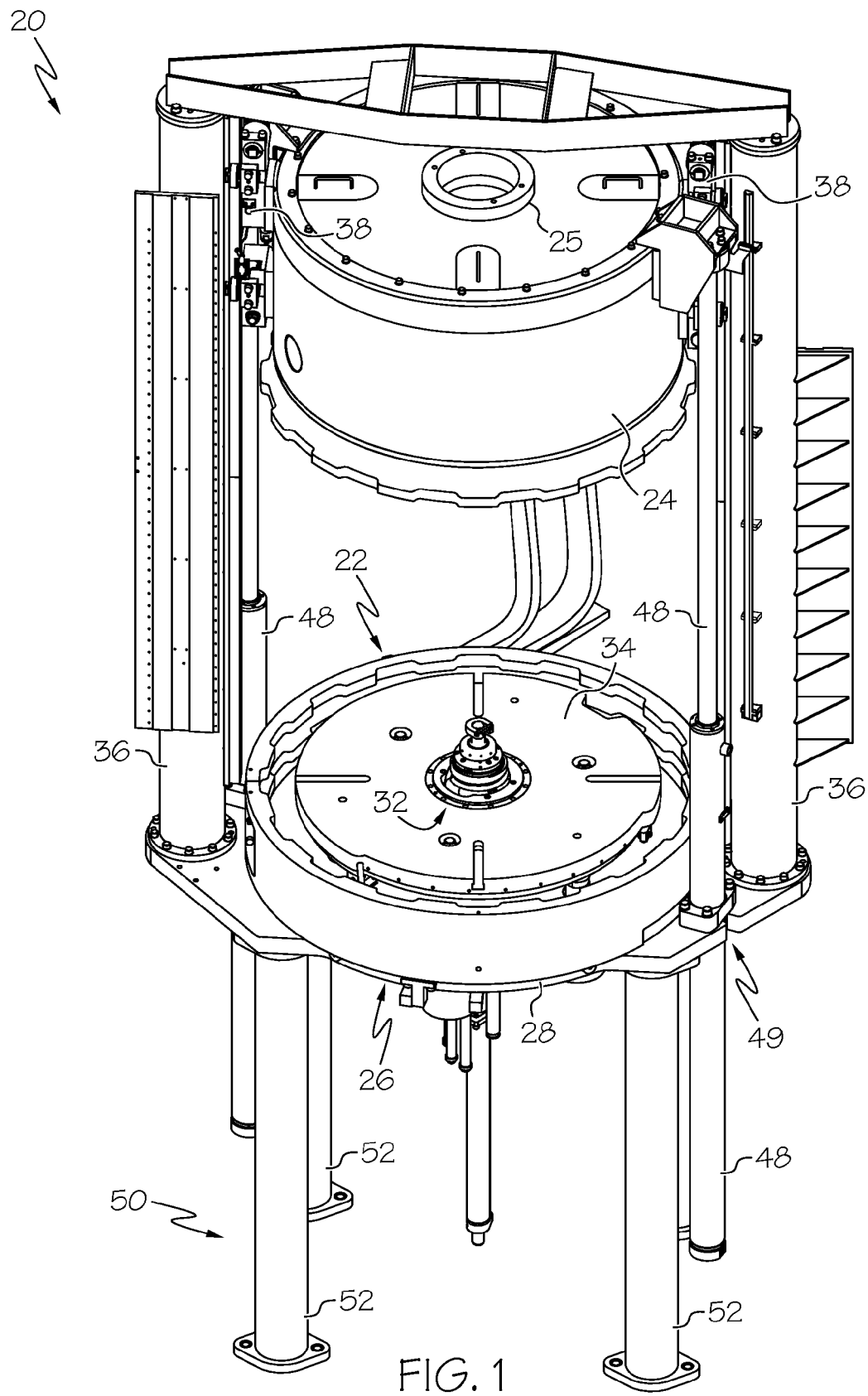
FIG. 1 is a perspective view of an example tire curing press according to the instant application.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 2:
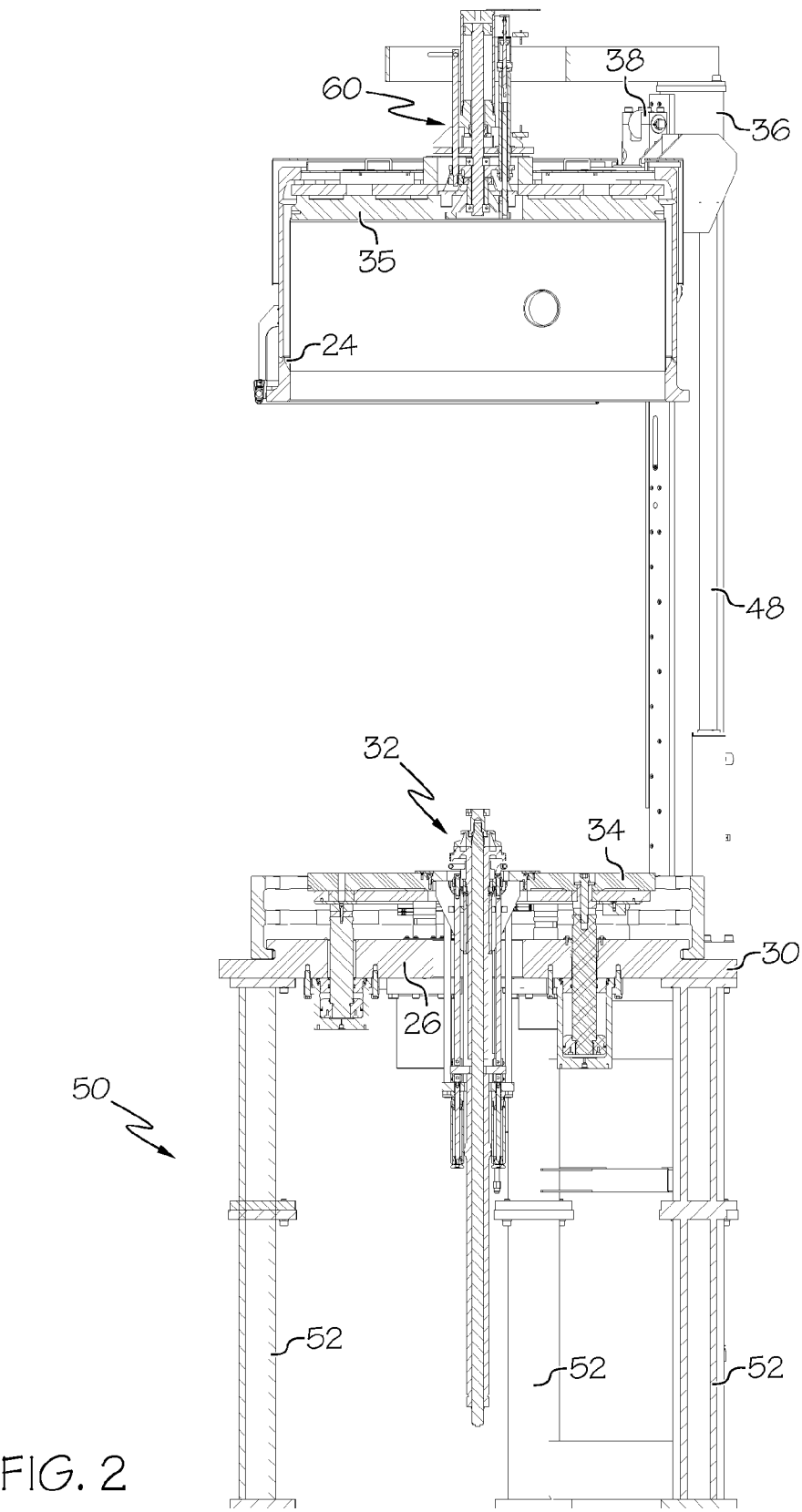
FIG. 2 is a front sectional view of the tire curing press.

Turning to the shown example of FIGS. 1-2, an example tire curing press 20 according to the instant application is shown. Generally, tire curing presses and methods for making tires are well known in the art, in which a green tire (not shown) undergoes a curing process in the tire curing press 20. The green tire is placed within a press cavity for curing vulcanized tires that is defined by a lower cavity part 22 and an upper cavity part 24. The upper cavity part 24 is axially aligned and vertically separable from the lower cavity part 22, and moves vertically to and from the lower cavity part 22 respectively to close and open the press 20. A protected, flexible, and movable carrier is provided to deliver service power (pneumatic, hydraulic, electric, etc.) to the upper cavity part 24. In FIG. 1, the tire curing press 20 is shown in the open position, in which the upper cavity part 24 is vertically raised upwards from the lower cavity part 22.

The tire curing press 20 further includes a base 26 comprising a main body 28 that at least partially forms the lower cavity part 22. A center mechanism 32 is centrally mounted in the base 26, which mounts a flexible bladder, diaphragm or bag (not shown) that may take any of a wide variety of shapes to transmit temperature and pressure produced internally by steam to an uncured or green tire band positioned within the tire mold sections for shaping the tire. The upper cavity part 24 provides an interior open space which accommodates, when the press is closed, the upper end of the center mechanism 32, as well as upper and lower tire mold sections (not shown). Additionally, a movable lower platen 34 is supported by the base 26 and is vertically movable relative to the base 26. The movable platen 34 is configured to support one tire mold section (e.g., the lower tire mold section) that is received within the upper cavity part 24 during a tire curing operation. When the press closes and is mechanically locked, the lower and upper cavity parts 22, 24 of the press cavity will be joined to form a single cavity or chamber in which is situated an upper mold platen and the vertically movable lower mold platen 34.

The tire curing press 20 further includes an outer riser column 36 secured to the base 26 that extends vertically upwards from the base 26. The outer riser column 36 is a fabricated tubular construction, although it can also have various geometries and constructions. The upper cavity part 24 is supported by the outer riser column 36 for vertical movement relative to the lower cavity part 22. Various numbers of outer riser columns can be used. For example, as shown, a pair of outer riser columns 36 can be coupled each to one of a pair of opposed extended support portions 30, with the upper cavity part 24 being vertically supported between the outer riser columns 36. The outer riser columns 36 are removably secured the base 26 by bolts or other mechanical fasteners that permit maintenance or replacement, although it is contemplated that the outer riser columns 36 could also be non-removably secured via welding or the like. The upper cavity part 24 of the press cavity is accurately guided for vertical movement by one or more roller guide assemblies, such as a pair of diametrically opposed roller guide assemblies 38 respectively located inwardly of each of the respective outer riser columns 36.

Vertical movement of the upper cavity part 24 of each press cavity is effected by a pair of vertically oriented, relatively long-stroke piston-cylinder lifting assemblies 48. Extension and retraction of the piston-cylinder assemblies 48 raises and lowers the upper cavity part 24. The piston-cylinder assemblies 48 are aligned with the outer riser columns 36, and may also be secured (removably or non-removably) to the extended support portion 30 of the base 26. Additionally, because the piston-cylinder assemblies 48 may have a relatively long stroke length to accommodate the upwards distance traveled by the upper cavity part 24, at least a portion of the piston-cylinder assemblies 48 can be disposed above the base 26 while another portion can be disposed below the base 26. For example, the extended support portion 30 can include a recess 49 or cavity extending a distance therein to at least partially receive each of the piston-cylinder assemblies 48, which can then be secured to the extended support portion 30.

A main support frame 50 includes a plurality of discrete support columns 52 fixed to the base 26 and to a support surface for supporting the tire curing press 20. The main support frame 50 is configured to support the base 26 upon a support surface, such as a factory floor, a supporting table or frame, etc. The main support frame 50 is further configured to support the outer riser columns 36 above and separated a distance from the support surface. Thus, the main support frame 50 supports the base 26, which in turn supports the outer riser columns 36 via the extended support portions 30. Each of the discrete support columns 52 is a fabricated tubular construction with a mounting flange disposed at each end, although they can also have various geometries and constructions. Due to the nature of the support columns 52, the main support frame 50 provides a large open area between the various support columns 52, accessible from a plurality of various angles around the press, to contain and provide ready access to various operative elements of the tire curing press 20. This can allow for easier assembly, disassembly, maintenance, repair, etc. of various parts, such as the outer riser columns 36, the center mechanism 32, utility service hook-ups, and other elements. For example, operational power for operation of the tire curing press can be provided by one or more utility services, such as electric, pneumatic, hydraulic, gas, etc. In one example, the motive power for elements of the tire curing press 20 can be provided by hydraulic and pneumatic utility services, although a low voltage electrical system (e.g., 24 volts or the like) can also be provided for use with a control system, sensors, audio/video indicators, etc.

As shown in FIG. 2, a segmented mold operator 60 is provided to operate a segmented mold used for molding and vulcanizing tire casings. An assembly of molding segments is used for the tread that are radially segmented into a plurality of arcuate tread segments about the circumference of the mold. The segments are suspended from the upper cavity part 24 or the movable upper press plate 35 so that when the press is opened the segments will move with the plate as it is lifted off and swung. In use, heated exterior components of the mold are moved into contact position with the tread and sidewall portions of the uncured tire to thereby cure the tire from the outside. A heated bladder is inflated to contact the inner surface of the tire to help shape and cure the tire from the inside.

Operating structure radially brings the segments toward each other to form an uninterrupted molding ring, or to radially to separate them toward an open, unmolding position. For example, vertical movement of a cone ring up and down along the axis of rotation of the press is translated into outward and inward radial movement of the segments, respectively, relative to the top portion of the container. To remove a tire that is being cured in the mold, the segments are moved sufficiently radially outward so that the entirety of the segments completely clears the outermost diameter of the tire when the upper portion of the container is raised.

In operation, the segmented mold in its open position provides sufficient clearance to install an uncured tire therein. The segmented mold operator 60 described herein is coupled to the upper cavity part 24 and moves together with the upper cavity part 24. The segmented mold operator 60 includes an upper portion that extends outwards of the upper cavity part 24, and a lower portion disposed within an interior of the upper cavity part 24. The lower portion is further capable of moving independently of the upper cavity part 24 to apply a squeeze pressure to the tire press cavity via a mold adapter ring.

Figure 3:
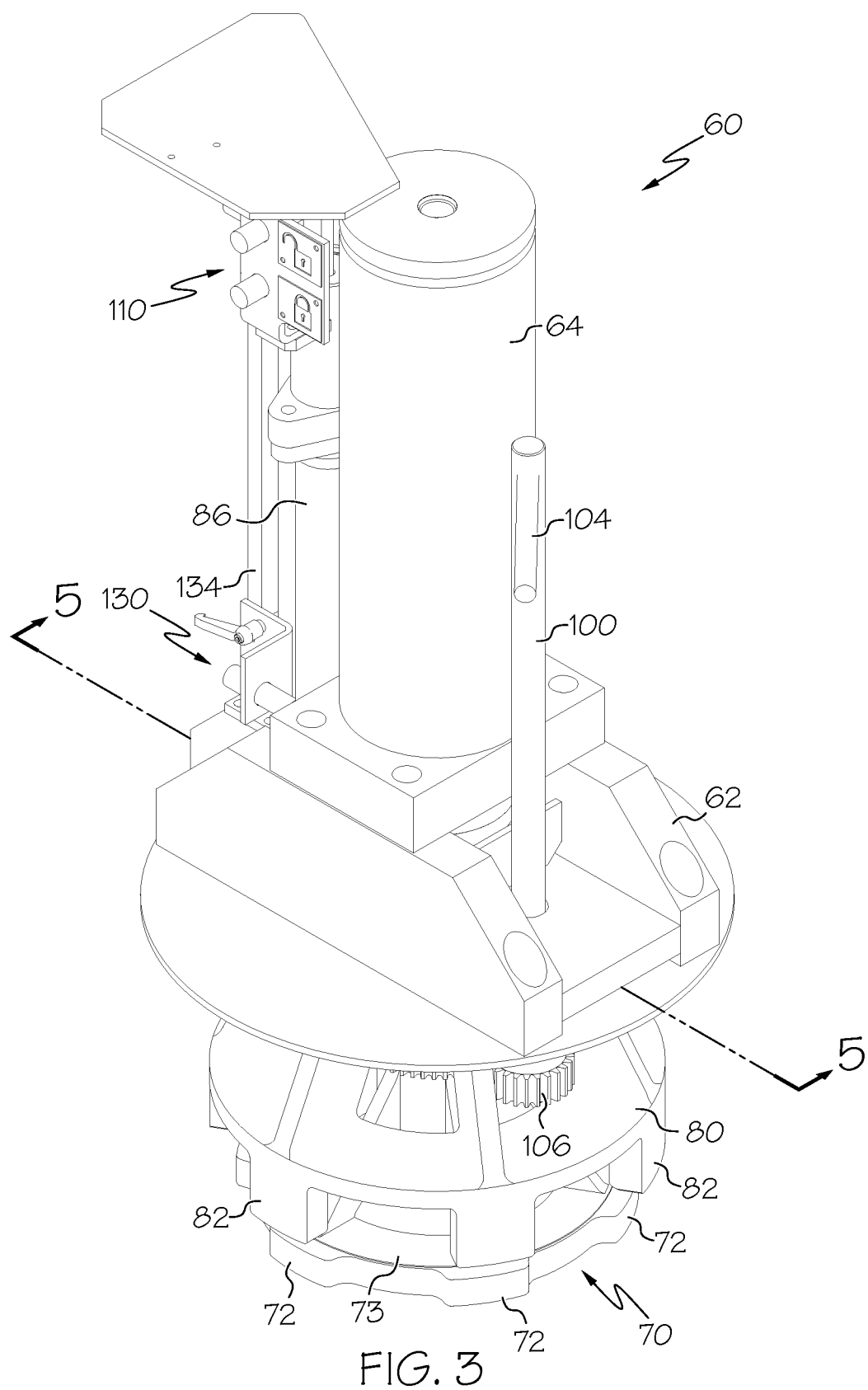
FIG. 3 is a front perspective view of an example segmented mold operator isolated from the tire curing press.
Figure 4:
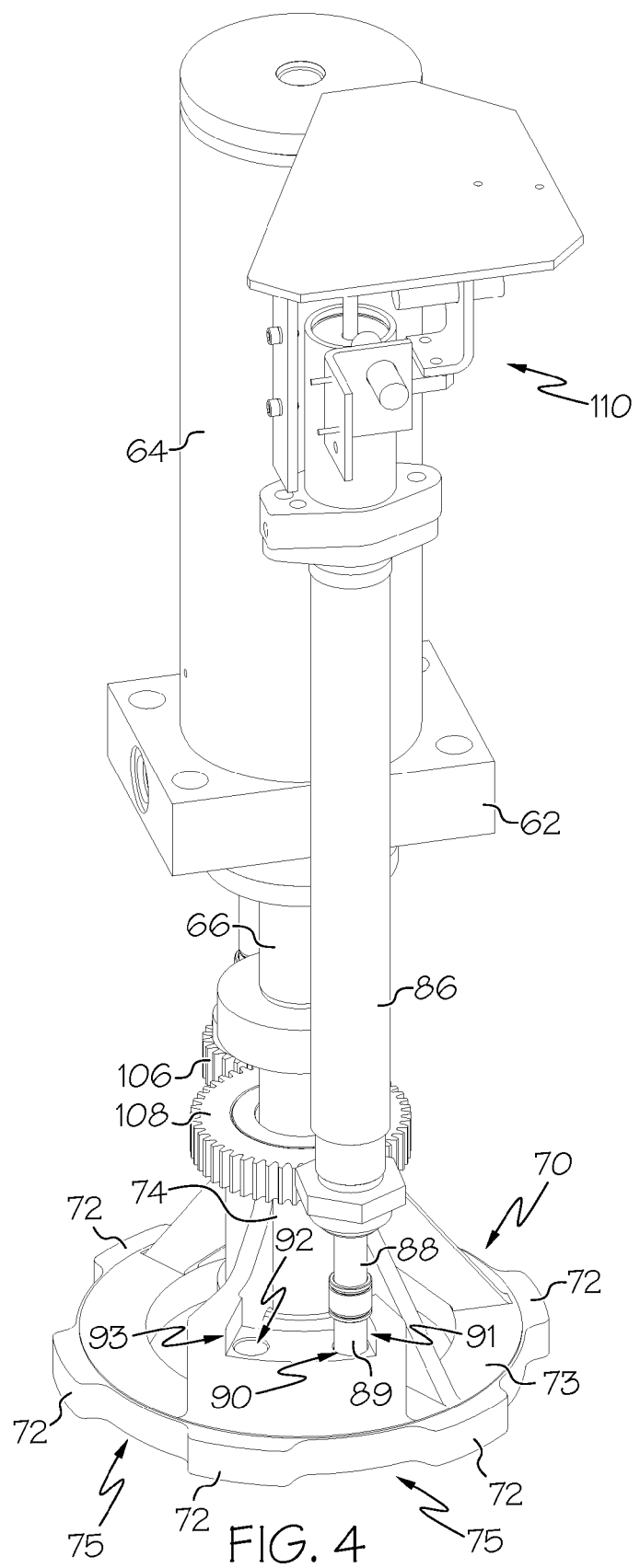
FIG. 4 is a rear perspective view of the example segmented mold operator of FIG. 3 with selective portions removed for clarity.

Turning to FIGS. 3-4, the segmented mold operator 60 includes a main frame 62 fixed to the upper cavity part 24 of the tire press cavity. The main frame 62 can be secured by bolts or another removable connection to a top 25 of the upper cavity part 24, and typically is located about a central hole that extends into an interior of the upper cavity part 24. The main frame 62 is secured in a non-rotatable manner to the upper cavity part 24. A control plunger 64 includes an axially movable cylinder rod 66 that is configured to apply a squeeze pressure to said tire press cavity, such as via a mold adapter ring 68 (e.g., shown schematically in FIG. 5). Typically, each tire curing press is adaptable for use with various segmented molds in order to produce a number of tire sizes, tread patterns, etc. to accommodate the large variety of pneumatic tire sizes. Thus, the mold adapter ring 68 can be used as an interface between the segmented mold operator 60 and each different segmented mold.

The control plunger 64 can be driven by a pneumatic system, hydraulic system, electrically powered system, and/or other types of mechanisms. In the shown example, the control plunger 64 is a hydraulic cylinder that utilizes hydraulic fluid to drive axial movement of the cylinder rod 66 within the interior of the upper cavity part 24. Due to the interchangeable nature of the mold ring adapter 68, a removable connection is provided to the cylinder rod 66 of the control plunger 64. In one example, a rotatable lock ring 70 is provided comprising a plurality of teeth 72 radially arranged thereon to rotatably interface with the mold ring adapter 68, such as via a bayonet connection or other rotatable connection. The rotatable lock ring 70 includes an inner hub 74 that is rotatably coupled about an end 76 of the cylinder rod 66 and is axially movable together with the cylinder rod 66. The teeth 72 are radially arranged on an outer hub 73 of the rotatable lock ring 70. The rotatable lock ring 70 is rotatable so that the teeth 72 selectively interface with (in a locked condition) or separate from (in an unlocked condition) corresponding teeth 69 or other rotatable locking structure of the mold ring adapter 68.

Additionally, a lock ring frame 80 is coupled to the cylinder rod 66 and is axially movable therewith. The lock ring frame 80 is non-rotatably secured to the cylinder rod 66. The lock ring frame 80 is independent from the rotatable lock ring 70, such that the rotatable lock ring 70 can rotate relative to the lock ring frame 80, and is separated therefrom along the cylinder rod 66. Additionally, the lock ring frame 80 comprises an abutment surface 82 configured to selectively engage the mold ring adapter 68. As will be described later (e.g., see FIG. 7C), the abutment surface 82 can selectively engage a top of the lugs of the mold ring adapter 68 to thereby separate the teeth 72 of the rotatable lock ring 70 from the mold ring adapter 68. For example, the abutment surface 82 can depend downwardly from the lock ring frame 80 and is configured to apply a force to the mold ring adapter 68 to thereby separate the mold ring adapter 68 from the plurality of teeth 72 of the rotatable lock ring 70. The abutment surface 82 can, for example, apply a downward force to the corresponding teeth 69, lugs, or other structure of the mold ring adapter 68. The abutment surface 82 could comprise a single element, such as an annular ring or the like. Alternatively, the abutment surface 82 could comprise a multiple elements, such as portions of an annular ring. In the shown example, the abutment surface 82 can comprise a plurality of teeth 82 arranged radially about the lock ring frame 80. Various numbers and positions of the teeth 82 are contemplated. In one example, the teeth 82 can have a number and position corresponding to the plurality of teeth 72 of the rotatable lock ring 70.

Additionally, a locking plunger 86 is fixed to the lock ring frame 80 and includes a lock rod 88 that is axially movable with respect to the rotatable lock ring 70. The locking plunger 86 is secured to the lock ring frame 80, and is axially movable together with the lock ring frame 80 during extension and retraction of the main cylinder rod 66. Similarly, the locking plunger 86 is axially movable relative to the main frame 62 of the segmented mold operator 60 via a bushing 63 or other relatively high-tolerance bearing or guide. If desired, the lock rod 88 may similarly pass through a bushing 85 or other relatively high-tolerance bearing or guide positioned on the lock ring frame 80 to further control axial alignment of the system. The locking plunger 86 can be driven by a pneumatic system, hydraulic system, electrically powered system, and/or other types of mechanisms. In the shown example, the locking plunger 86 is a hydraulic cylinder that utilizes hydraulic fluid to drive axial movement of the lock rod 88.

The locking plunger 86 is provided to selectively engage the rotatable lock ring 70 to thereby inhibit or prevent rotation of the rotatable lock ring 70 relative to the lock ring frame 80. When the rotatable lock ring 70 interfaces with the mold ring adapter 68 via a bayonet connection, the locking plunger 86 can selectively inhibit or prevent rotation of the rotatable lock ring 70 to thereby lock the connection between the teeth 72 of the rotatable lock ring 70 and the corresponding teeth 69 or lugs of the mold ring adapter 68. As shown in FIG. 4 (the frame 62 is not shown for clarity), the rotatable lock ring 70 further comprises at least a first hole 90 extending therein to at least partially receive the lock rod 88 and thereby prevent rotation of the rotatable lock ring 70. For example, the first hole 90 can be provided on the outer hub 73 of the rotatable lock ring 70, such as in a suitable boss or the like. The first hole 90 is sized to at least partially receive the lock rod 88, such as an end 89 of the lock rod. The first hole 90 may partially or completely extend through the outer hub 73. As shown in the partial sectional view of FIG. 5, the first hole 90 extends a substantial distance, such as completely, through a boss of the outer hub 73 to thereby enhance a locking force to inhibit or prevent rotation of the rotatable lock ring 70 in the high pressure and high temperature environment of a tire press.

Figure 7A:
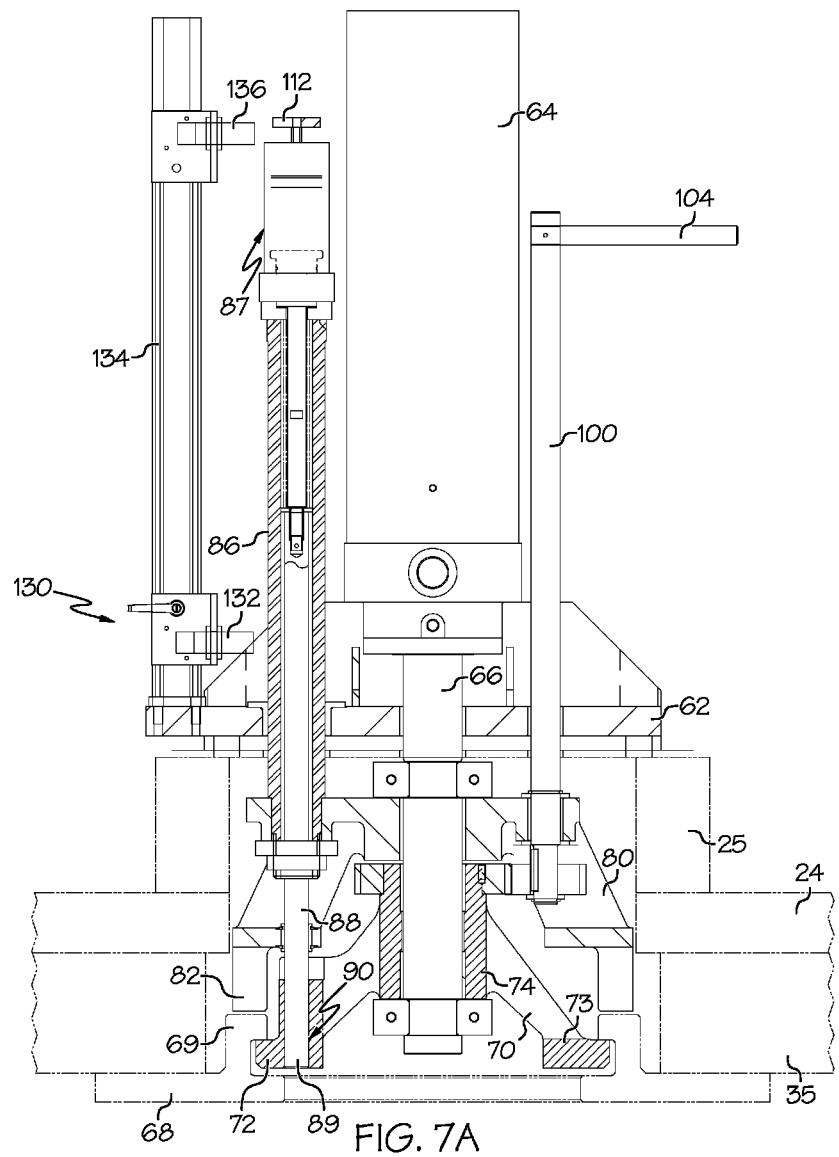
FIGS. 7A-7E are similar to FIG. 5, but show the segmented mold operator in various operational conditions.
Figure 7B:
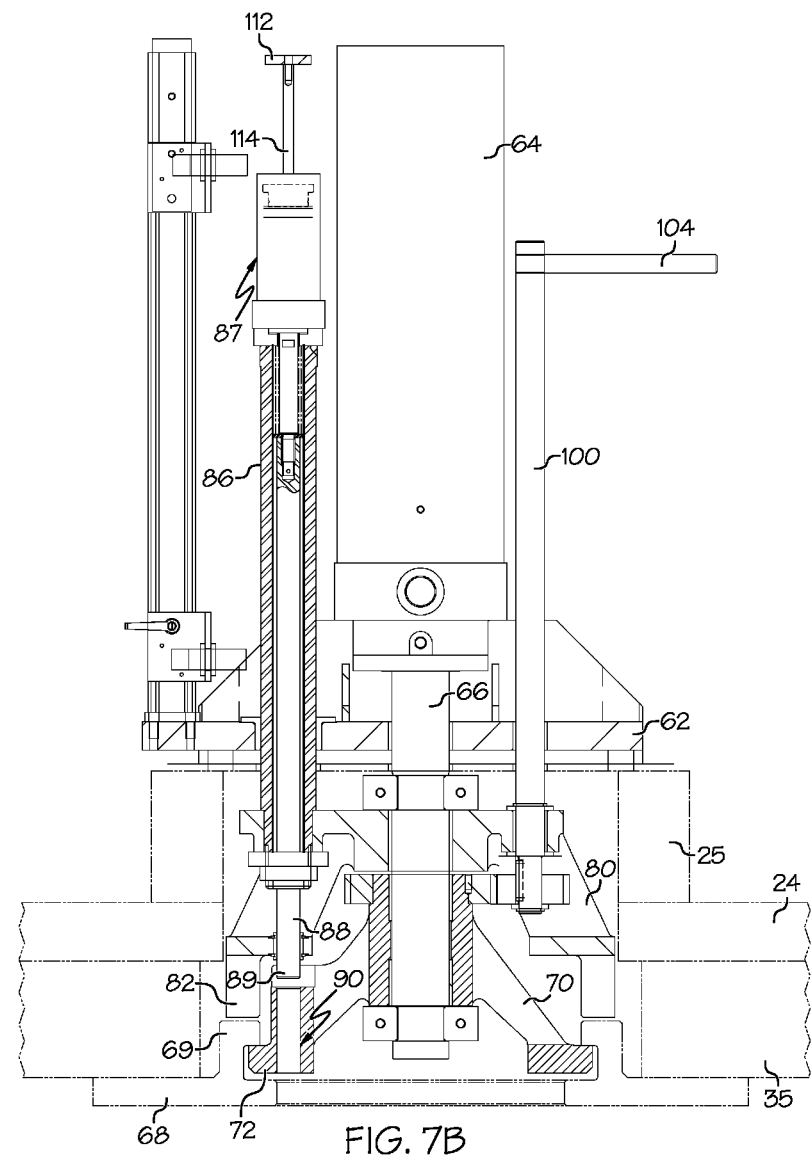

A brief operational example of the segmented mold operator 60 is illustrated in FIGS. 7A-7B. In FIG. 7A, the end 89 of the lock rod 88 extends substantially completely through the first hole 90 of the rotatable lock ring 70. Because the locking plunger 86 is fixed to the lock ring frame 80, which is independent from the rotatable lock ring 70, no rotation of the rotatable lock ring 70 is possible and it is therefore rotationally locked in position. In FIG. 7B, when it is desired to unlock the mold ring adapter 68, the lock rod 88 is axially retracted upwards such that the end 89 is removed from the first hole 90. As a result, it is now possible for the rotatable lock ring 70 to rotate freely upon the cylinder rod 66 and relative to the mold ring adapter 68 to thereby unlock the bayonet connection.

Additionally, the rotatable lock ring 70 can further include at least a second hole 92 (and possibly even more holes) extending therein to at least partially receive the lock rod 88. As shown in FIG. 4, the second hole 92 can be radially offset from the first hole 90, and may also be disposed within the same boss (or even a different location). Due to the radial offset, the lock rod 88 can be selectively received into either of the first or second holes 90, 92 depending upon the rotational position of the rotatable lock ring 70. In one example, the first and second holes 90, 92 can be positioned so that the end 89 of the lock rod 88 is received into the first hole 90 when the rotatable lock ring 70 is engaged with the mold ring adapter 68 via the bayonet connection, and conversely the end 89 of the lock rod 88 is received into the second hole 92 when the rotatable lock ring 70 is disengaged from the mold ring adapter 68. Additionally, the second hole 92 can have different characteristics as compared to the first hole 90. For example, the second hole 92 can have a depth relatively less than a depth of the first hole 90, such as a blind hole, as will be described in more detail herein.

Turning back to FIGS. 5-6, rotation of the lock ring 70 about the cylinder rod 66 can be effected in various manners.

Figure 6:
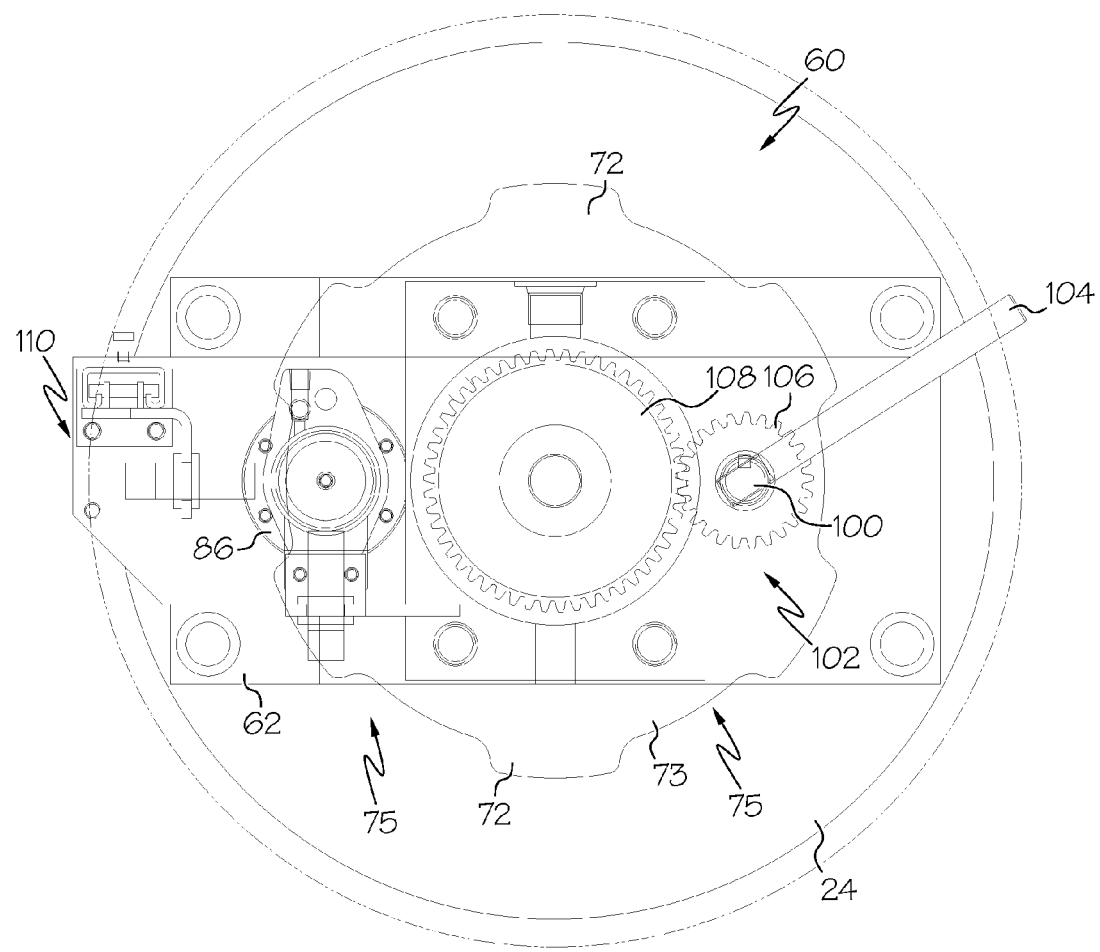
FIG. 6 is a top view of the example segmented mold operator with selective portions removed for clarity.

FIG. 6 illustrates a top view of the segmented mold operator with selective portions removed for clarity. In one example, the rotatable lock ring 70 can be rotatably driven about the cylinder rod 66 by an actuator 100 via a gear train 102 or other force translator. The actuator 100 can be a rotatable shaft with a user-operable handle 104 or the like thereon for rotating the actuator 100. The rotatable shaft of the actuator 100 can be rotationally secured to the lock ring frame 80, such as via a bearing or bushing. The actuator 100 can extend vertically upwards through the main frame 62, either through an oversized hole or via an alignment element, such as a bushing or bearing.

The actuator 100 can be directly or indirectly coupled to a first gear 106 that engages at least a second gear 108 coupled to the rotatable lock ring 70, such as to the inner hub 74. Although only two spur gears 106, 108 are shown, it is contemplated that the gear train could have various numbers, types, and arrangements of gears or other force translator. Thus, a user can rotate the actuator 100 via the handle 104 to drive the first gear 106 and thereby rotate the second gear 108 to ultimately cause rotation of the rotatable lock ring 70 about the cylinder rod 66. Although a manually-operable handle 104 is shown, it is also contemplated that the actuator 100 could be driven by a piston-cylinder assembly or the like that is pivotally coupled between a fixed element (such as the frame 62) and the actuator 100. Actuation of the piston-cylinder assembly would cause extension of the piston to thereby cause rotation of the actuator 100 and ultimately the lock ring 70 about the cylinder rod 66. The piston cylinder assembly can be pneumatic, hydraulic, electrically powered, and/or other types of mechanisms could be used to cause rotation of the lock ring 70. In an alternative example, although not shown, rotation of the lock ring 70 can be caused by a linear actuator or the like without use of the actuator 100. A piston-cylinder assembly could be pivotally coupled between a fixed element (such as the frame 62) and the lock ring 70. Actuation of the piston-cylinder assembly would cause extension of the piston to thereby cause rotation of the lock ring 70 about the cylinder rod 66 without use of the intermediate actuator 100.

Due to the high temperature and high pressure environment of a tire cure press, it is desirable to maintain a safe working environment. Even so, a tire cure press is a relatively large machine and it can be difficult for workers to see all components at all times. This is especially true when various segmented tire molds are being changed within the press cavity. It can be especially beneficial to provide a visual and/or audible indication as to whether the rotatable lock ring 70 is in a locked or unlocked condition relative to the mold ring adapter 68.

Turning now to FIGS. 8A-8D, an electronic lock sensor 110 can be disposed at an upper portion 87 of the locking plunger 86. The electronic lock sensor 110 can be physically attached to an upper portion of the locking plunger 86 to move together therewith, or could be attached to another portion of the segmented mold operator 60 so as to be positioned near the upper portion 87 of the locking plunger 86. The electronic lock sensor 110 is configured to electronically sense an axial position of the lock rod 88 relative to the locking plunger 86. A sensor target 112 is fixed to an upper portion 114 of the lock rod 88 and is axially movable therewith. For example, the upper portion 114 of the lock rod 88 can be movable together with axial movement of the end 89 of the lock rod 88. The upper portion 114 can, for example, extend a distance upwards from the upper portion 87 of the locking plunger 86. Thus, when the end 89 of the lock rod 88 is axially movable relative to the rotatable lock ring 70, the upper portion 114 of the lock rod 88 has a similar or substantially identical axial movement.

The electronic lock sensor 110 is configured to detect the sensor target 112. The electronic lock sensor 110 can include various types of contact or non-contact sensors to detect the sensor target 112. For example, the lock sensor 110 can utilize various types, such as a contact switch, limit switch, etc. that is physically contacted, either directly or indirectly, by the sensor target 112 as the lock rod 88 moves vertically up and down. In another example, the lock sensor 110 is a non-contact type that is configured to detect when the sensor target 112 is physically adjacent to the lock sensor 110 as the lock rod 88 moves vertically up and down. For example, the lock sensor 110 can utilize photoelectric, inductive, magnetic, capacitive, hall effect, and/or ultrasonic sensors, or even other types of electronic position sensors, such as linear position sensors, encoders, or the like. These types of sensors can be beneficial to use in a manufacturing environment because the potential for wear and/or contamination is greatly reduced. In the shown example, the lock sensor 110 is a capacitive-type sensor that includes a plurality of detectors 116A, 116B. Preferably, the lock sensor 110 is capable of detecting at least two vertically spaced-apart positions of the sensor target 112, and as such includes at least a pair of detectors 116A, 116B. Of course, it is contemplated that the lock sensor 110 can detect even more vertically spaced-apart positions of the sensor target 112, and may include even more detectors. It is further contemplated that any or all of the detectors 116A, 116B can be adjustably or non-adjustably mounted to the locking plunger via a fixing plate 111.

Figure 8A:
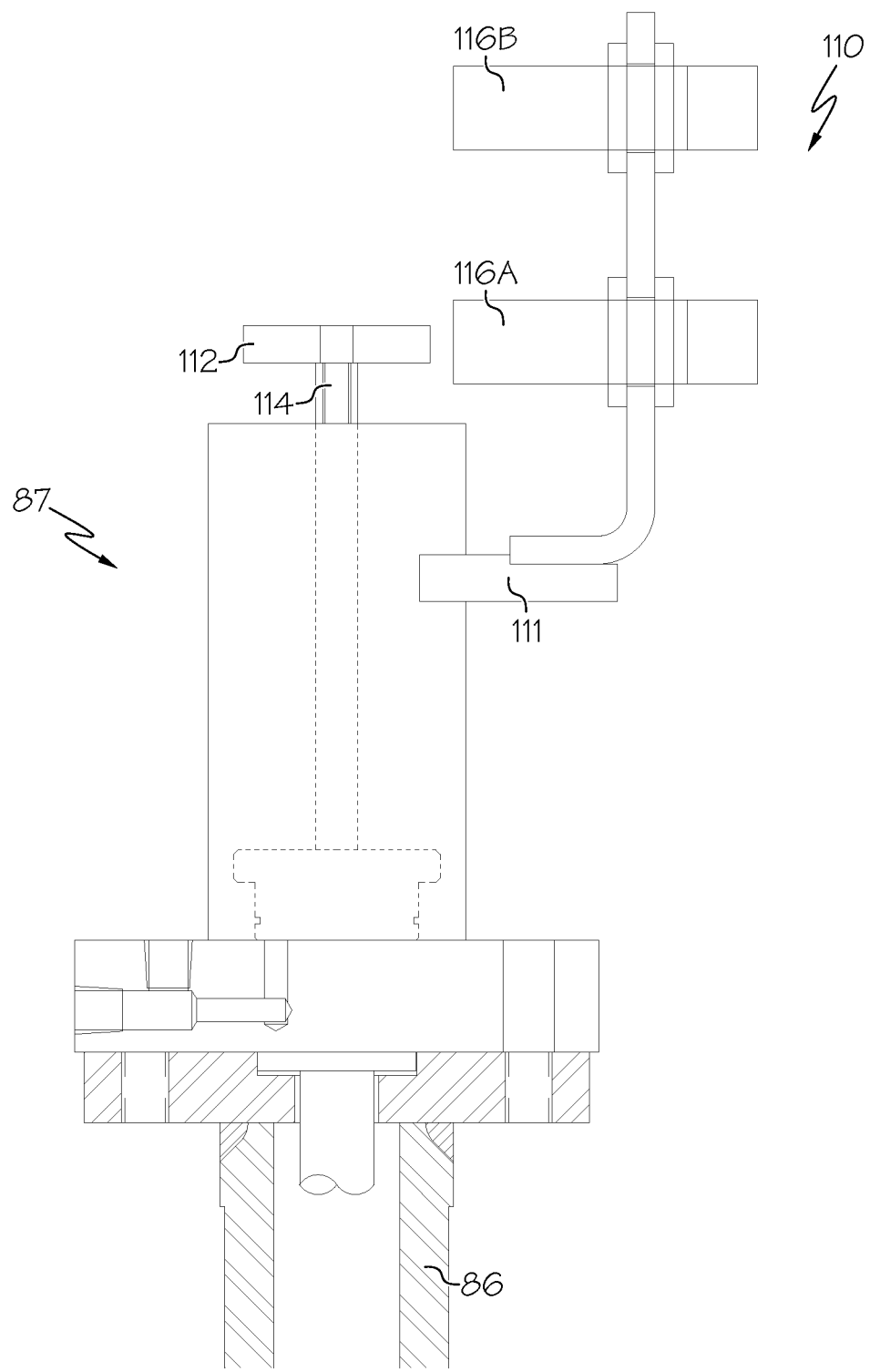
FIGS. 8A-8D show an example sensor for use with the segmented mold operator.

One example operational changeover of the mold ring adapter 68 (and corresponding segmented mold) will now be described, starting with FIG. 7A and the corresponding FIG. 8A. The mold ring adapter 68 is shown locked onto the rotatable lock ring 70 by the bayonet connection. The end 89 of the lock rod 88 is received within the first hole 90, and is in a substantially fully extended condition. The upper portion 114 of the lock rod 88 is at a low position so that the sensor target 112 is adjacent to the lower detector 116A. Thus, the lock sensor 110 is able to sense a first vertical position of the sensor target 112, and therefore the position of the end 89 of the lock rod 88. As a result, the lock sensor 110 is capable of determining that the rotatable lock ring 70 is in a locked condition.

Figure 8B:
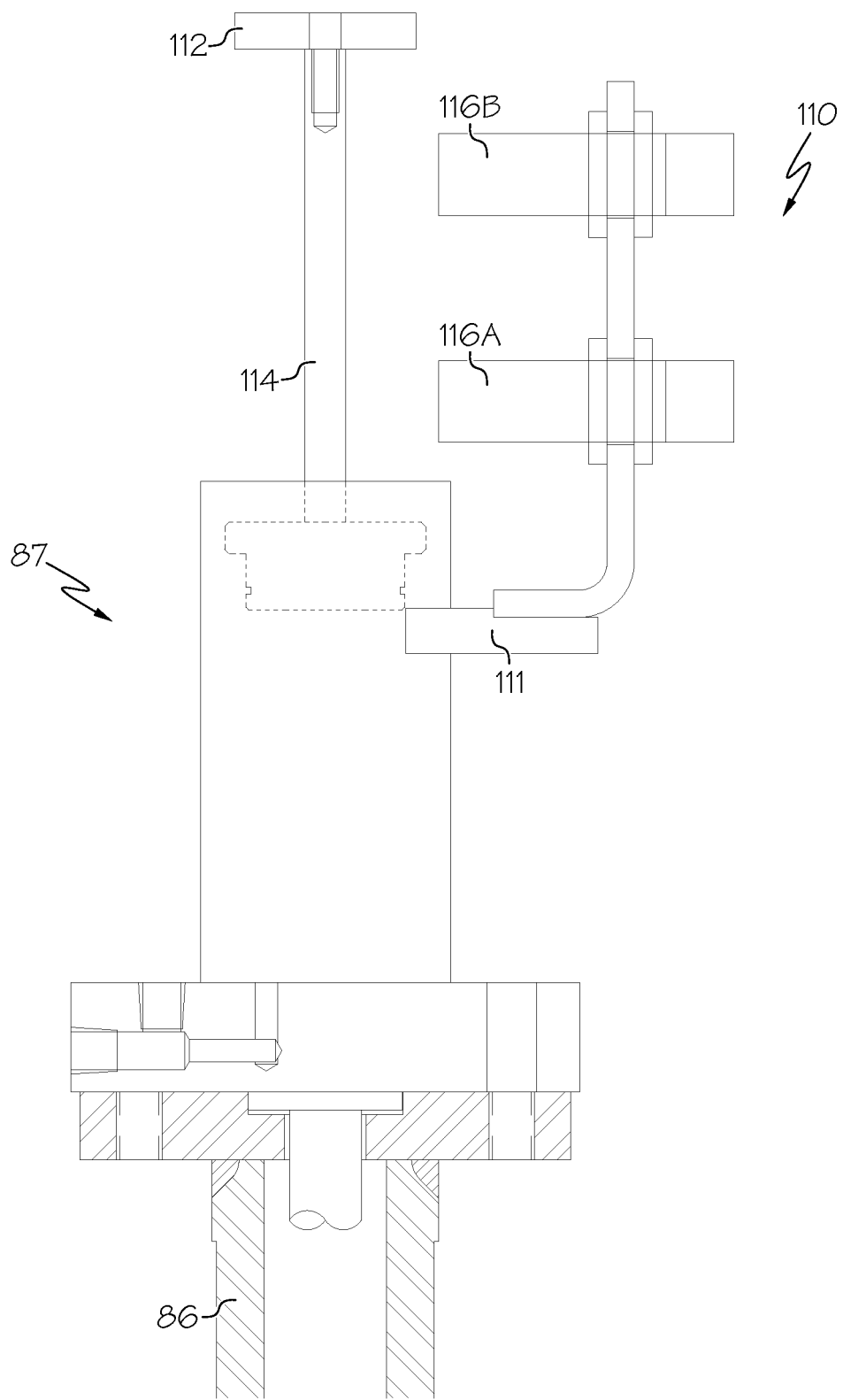

Turning now to FIGS. 7B and 8B, the lock rod 88 is raised vertically upwards such that the end 89 is removed completely from the first hole 90 and is in a substantially fully retracted condition. The upper portion 114 of the lock rod 88 is at a high position so that the sensor target 112 is separated from both of the detectors 116A, 116B. Preferably, the sensor target 112 is not sensed by either of the detectors 116A, 116B, and the system is able to sense another vertical position of the sensor target 112 (e.g., by a lack of detection), and therefore the position of the end 89 of the lock rod 88.

Figure 7C:
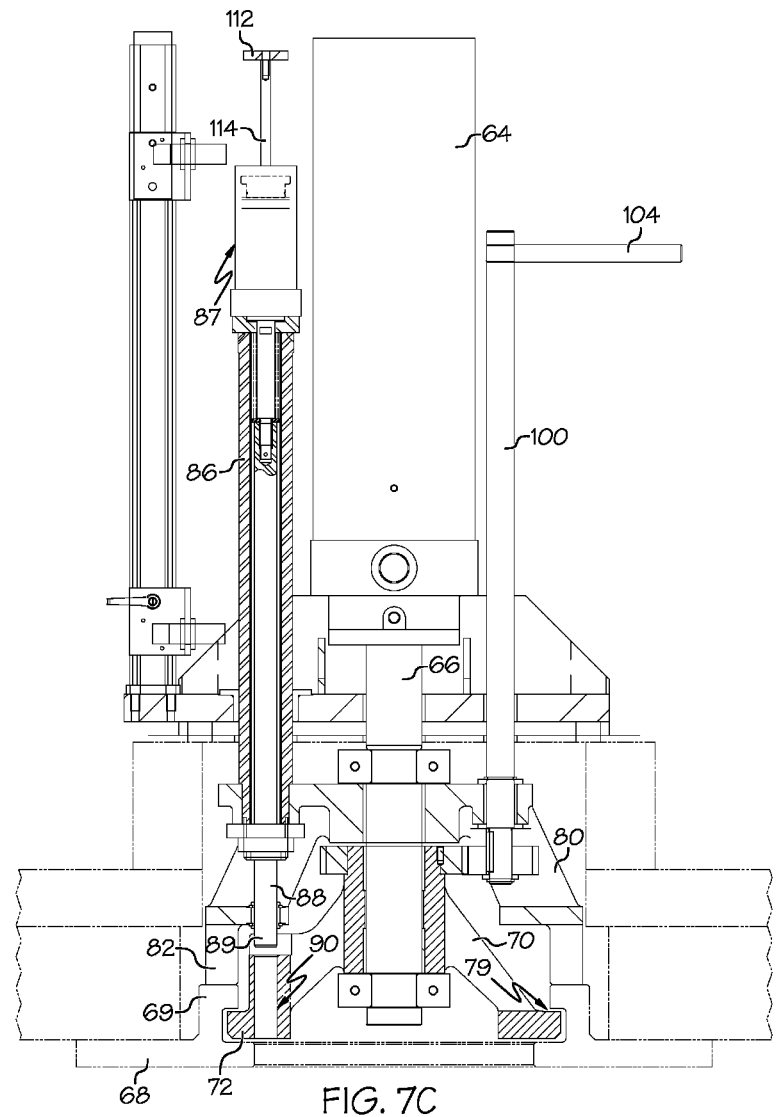

Moving onto FIG. 7C, the lock rod 88 remains in the vertically raised condition. Due to the high tolerances and the high pressure environment of the tire curing press, the mold ring adapter 68 can be somewhat difficult to remove from the rotatable lock ring 70. Thus, the control plunger 64 can be extended a relatively short distance for the purpose of separating the mold ring adapter 68 from the rotatable lock ring 70. While the mold ring adapter 68 (and the segmented mold) remains stationary within the press, the cylinder rod 66 can be extended a short distance, such as less than 10 mm and preferably less than 5 mm, so that the abutment surface 82 of the lock ring frame 80 abuts against a top surface of the corresponding teeth 69 or lugs of the mold ring adapter 68 to apply a downward force. At the same time, the teeth 72 of the rotatable lock ring 70 are moved downwards and out of contact with the teeth 69 of the mold ring adapter 68, thereby creating a small gap 79 between the rotatable lock ring 70 and the mold ring adapter 68 that facilitates rotation of the rotatable lock ring 70. At this time, although it may move together with the cylinder rod 66, the position of the sensor target 112 remains similar to that shown in FIG. 8B.

Figure 7D:
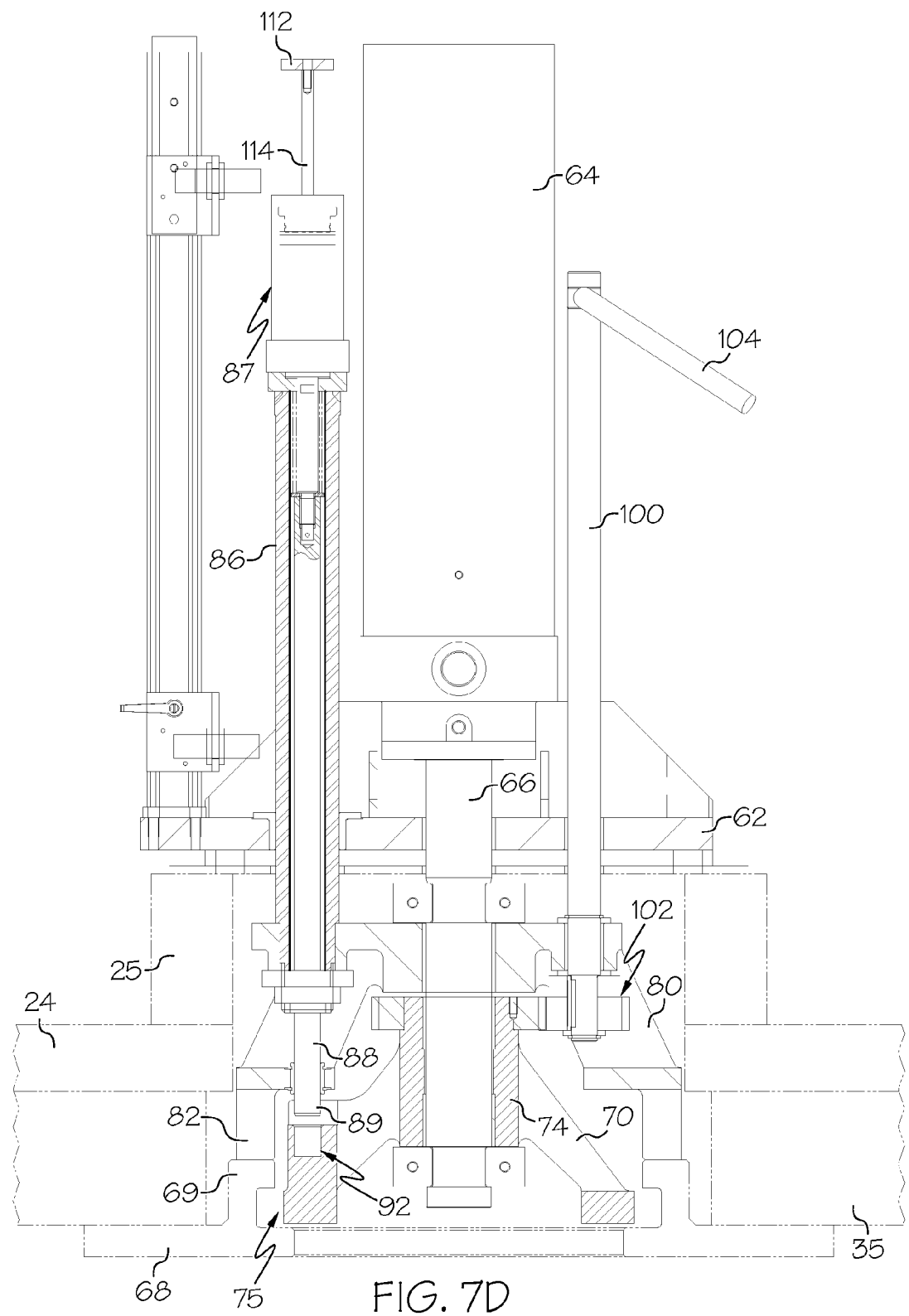

Turning now to FIG. 7D, the rotatable lock ring 70 is rotated about the axis of the cylinder rod 66, such as via operation of the actuator 100 and gear train 102. The rotatable lock ring 70 is rotated to a position so that the teeth 72 are disengaged from the corresponding teeth 69 or lugs of the mold ring adapter 68. Additionally, the teeth 69 of the mold ring adapter 68 are aligned with valleys 75 (e.g., see FIG. 4) between the various teeth 72 of the rotatable lock ring 70 so that the mold ring adapter 68 can be slidably separated apart from the rotatable lock ring 70. Further, the rotated position of the rotatable lock ring 70 locates the second hole 92 in alignment with the end 89 of the lock rod 88. As can be seen in FIG. 7D, the second hole 92 extends only partially into the boss and has a depth less than that of the first hole 90. For example, the second hole 92 can be a blind hole. Again, the vertical position of the sensor target 112 remains similar to that shown in FIG. 8B.

Overtravel structure can be provided in order to help align the end 89 of the lock rod 88 with the holes 90, 92, and/or to limit rotational travel of the rotatable lock ring 70 to thereby help align the teeth 72 with the teeth 69 or lugs of the mold ring adapter 68. For example, the boss containing the holes 90, 92 can include overtravel stops, such as a first overtravel shoulder 91 adjacent the first hole 90, and a second overtravel shoulder 93 adjacent the second hole 92. Thus, the rotatable lock ring 70 can be rotated only within the space delimited between the first and second overtravel shoulders 91, 93. Contact between the lock rod 88 (or spacer thereon) and the overtravel shoulders 91, 93 can directly correspond to an aligned position with the holes 90, 92, or alternatively the overtravel shoulders 91, 93 can simply prevent excessive rotation of the rotatable lock ring 70.

Figure 7E:
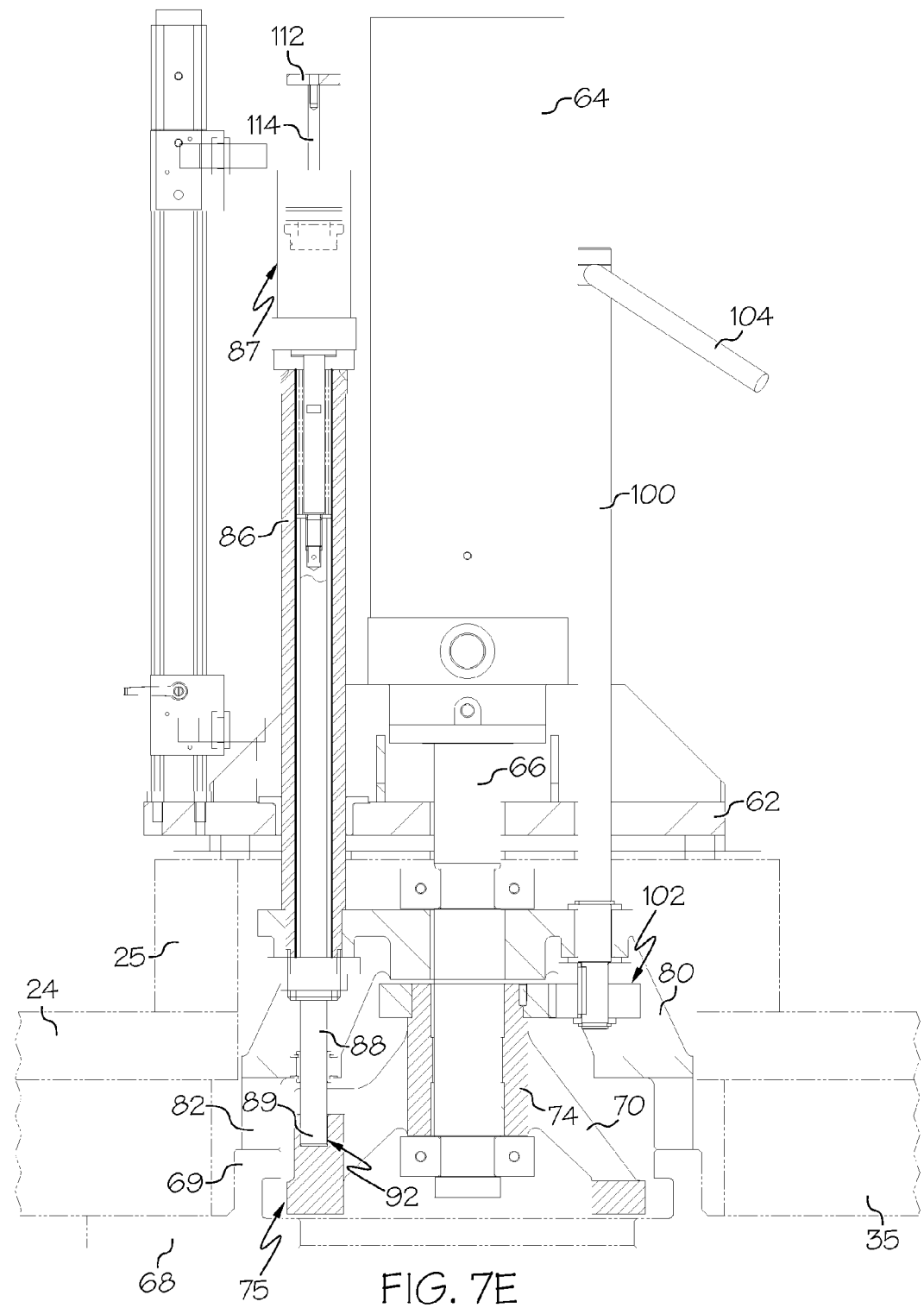
Figure 8C:
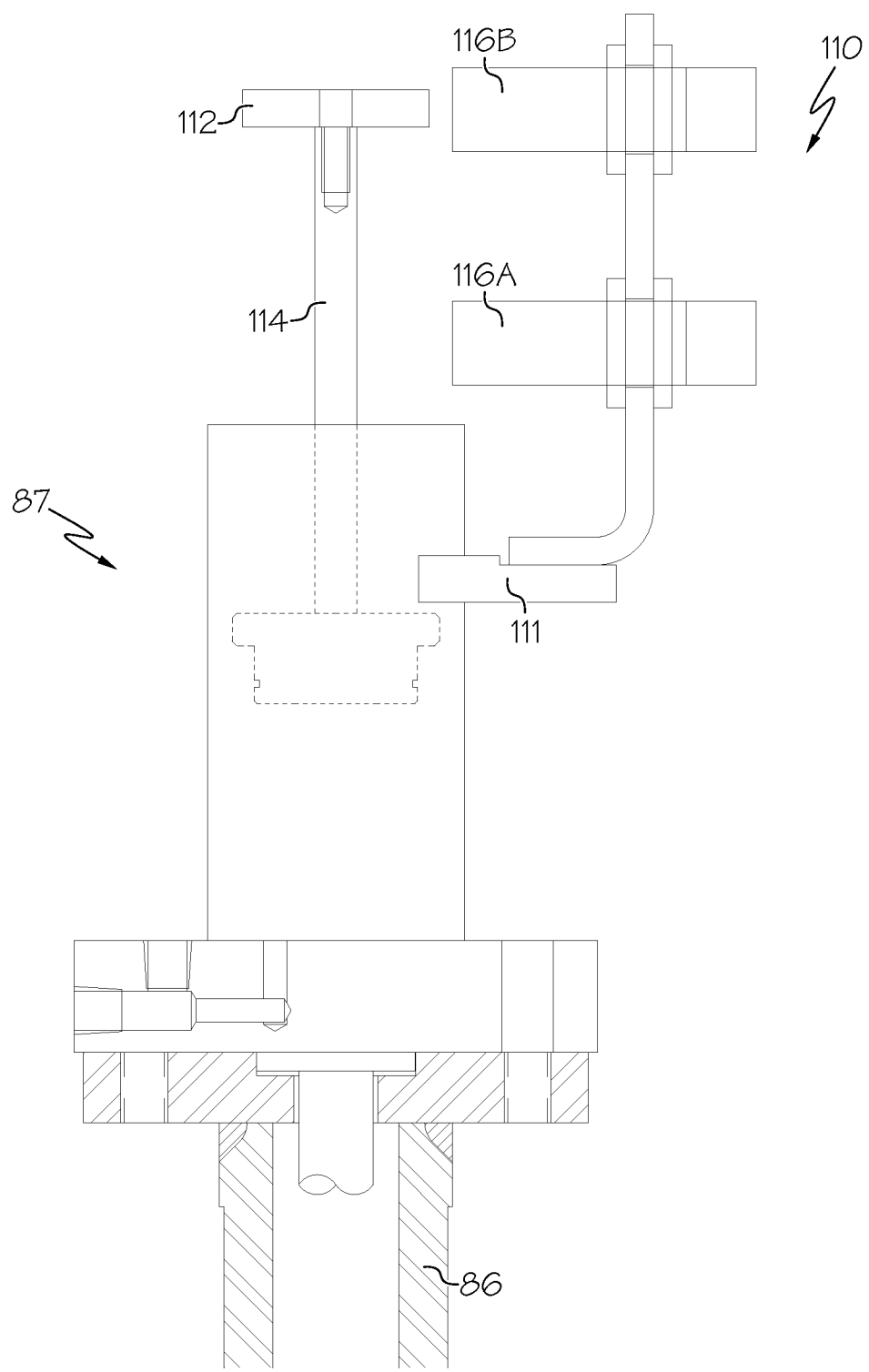

Finally, FIGS. 7E and 8C illustrate the fully unlocked condition of the segmented mold operator. The mold ring adapter 68 is unlocked and ready to be vertically separated from the rotatable lock ring 70. The lock rod 88 is extended so that the end 89 is received and seated into the second hole 92. The upper portion 114 of the lock rod 88 is now at a high position so that the sensor target 112 is adjacent to the upper detector 116B. Thus, the lock sensor 110 is able to sense a second vertical position of the sensor target 112, and therefore the position of the end 89 of the lock rod 88. As a result, the lock sensor 110 is capable of determining that the rotatable lock ring 70 is in an unlocked condition.

Indeed, due to the range of motion of the rotatable lock ring 70, the electronic lock sensor 110 can be configured to detect whether the lock rod 88 is received into either the first hole 90 or the second hole 92 of the rotatable lock ring 70 via the ability to detect the sensor target 112 via the detectors 116A, 116B. When the lock sensor 110 detects the sensor target 112 adjacent to the lower detector 116A, the system knows that the lock rod is received into the first hole 90; likewise for the second hole 92 when the sensor target 112 is adjacent to the upper detector 116B. Finally, if the sensor target 112 is detected by both or neither of the detectors 116A, 116B, the system knows that the lock rod 88 is at some intermediate position. As a result, the system can readily determine whether the rotatable lock ring 70 is in a locked or unlocked condition.

Figure 8D:
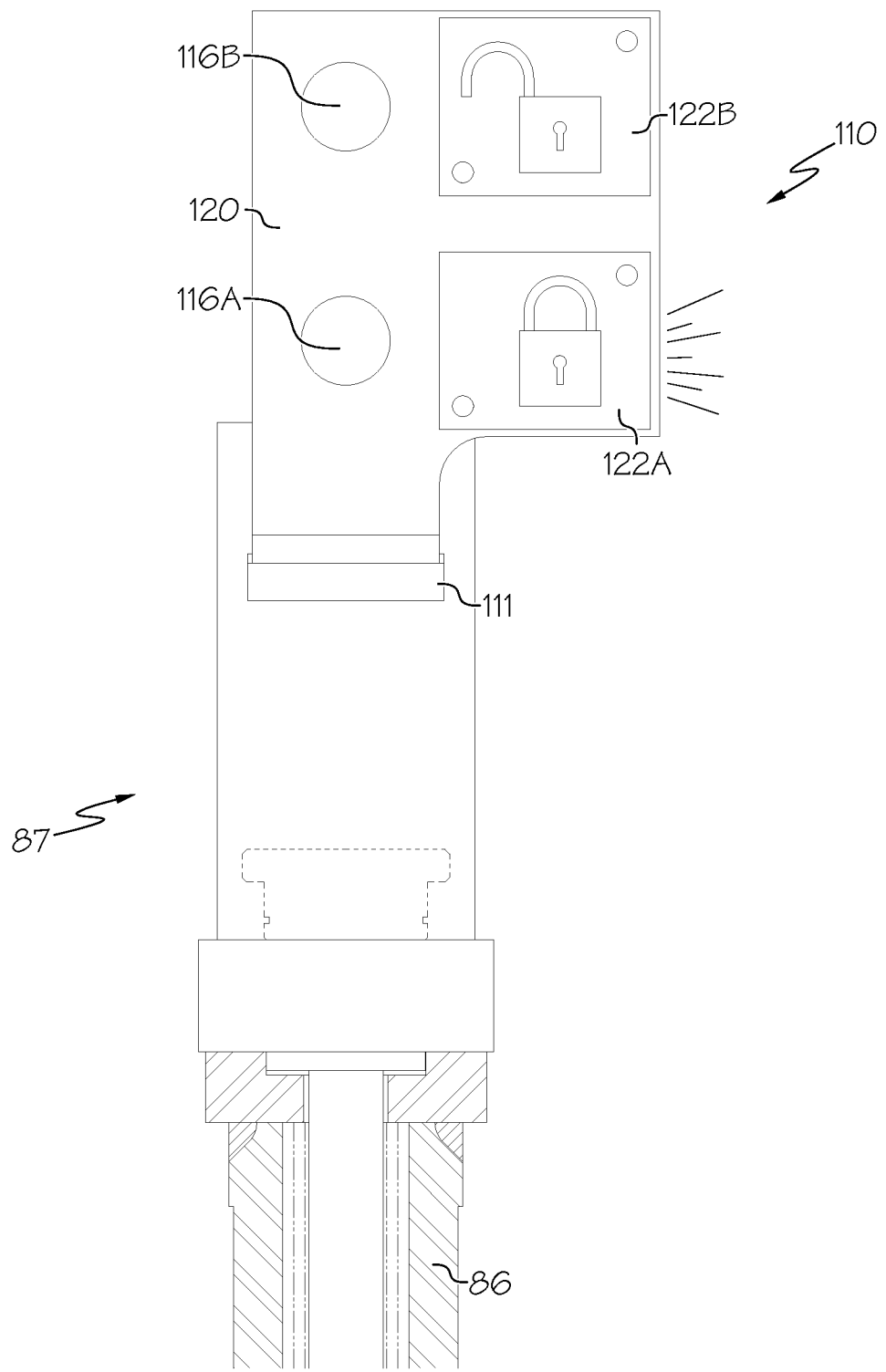

Turning to FIG. 8D, it can be especially beneficial to provide a visual and/or audible indication as to whether the rotatable lock ring 70 is in a locked or unlocked condition relative to the mold ring adapter 68. In one example, a display 120 can be provided at the upper portion 87 of the locking plunger 86 that is visible to a user located near a base of the tire press cavity (e.g., a user standing on the factory floor) to thereby provide a visual indication of the axial position of the lock rod 88. The display 120 can be mechanically and/or electrically operated based upon operation of the lock sensor. The display can include indicators 122A, 122B, such as lighted indicia, that corresponds to each of the detectors 116A, 116B. For example, a lower indicator 122A can be a picture showing a locked condition that is selectively illuminated when the lower detector 116A detects the sensor target 112. This example is depicted in FIG. 8D, which corresponds to the position of the lock rod 88, and locked condition of the rotatable lock ring 70, shown in FIG. 8A. Alternatively, the upper indicator 122B can be a picture showing an unlocked condition that is selectively illuminated when the upper detector 116B detects the sensor target 112 (not shown, although it would correspond to the conditions described with reference to FIG. 8C). The indicators 122A, 122B can be mounted to the same assembly carrying the detectors 116A, 116B (e.g., fixing plate 111), or even on a separate structure. It is contemplated that the indicators 122A, 122B can be static or flashing lights, static images, illuminated images, flashing images, animations, videos, etc., and may even be combined with audible alerts. It is further contemplated that the indicators 122A, 122B may be located elsewhere on the tire press, or may include duplicate indicators at multiple locations. The lock sensor information is further provided to a system controller for the tire press. As a result, the locked/unlocked condition of the segmented mold operator can be readily understood by users located variously about the tire press. In yet another example, the sensor target 112 could carry a mechanical pointer, such as an arrow or the like, that could physically point to one of the indicators 122A, 122B to mechanically show a locked or unlocked condition. Such a mechanical system could obviate the need for an electrical indication system.

Figure 9:
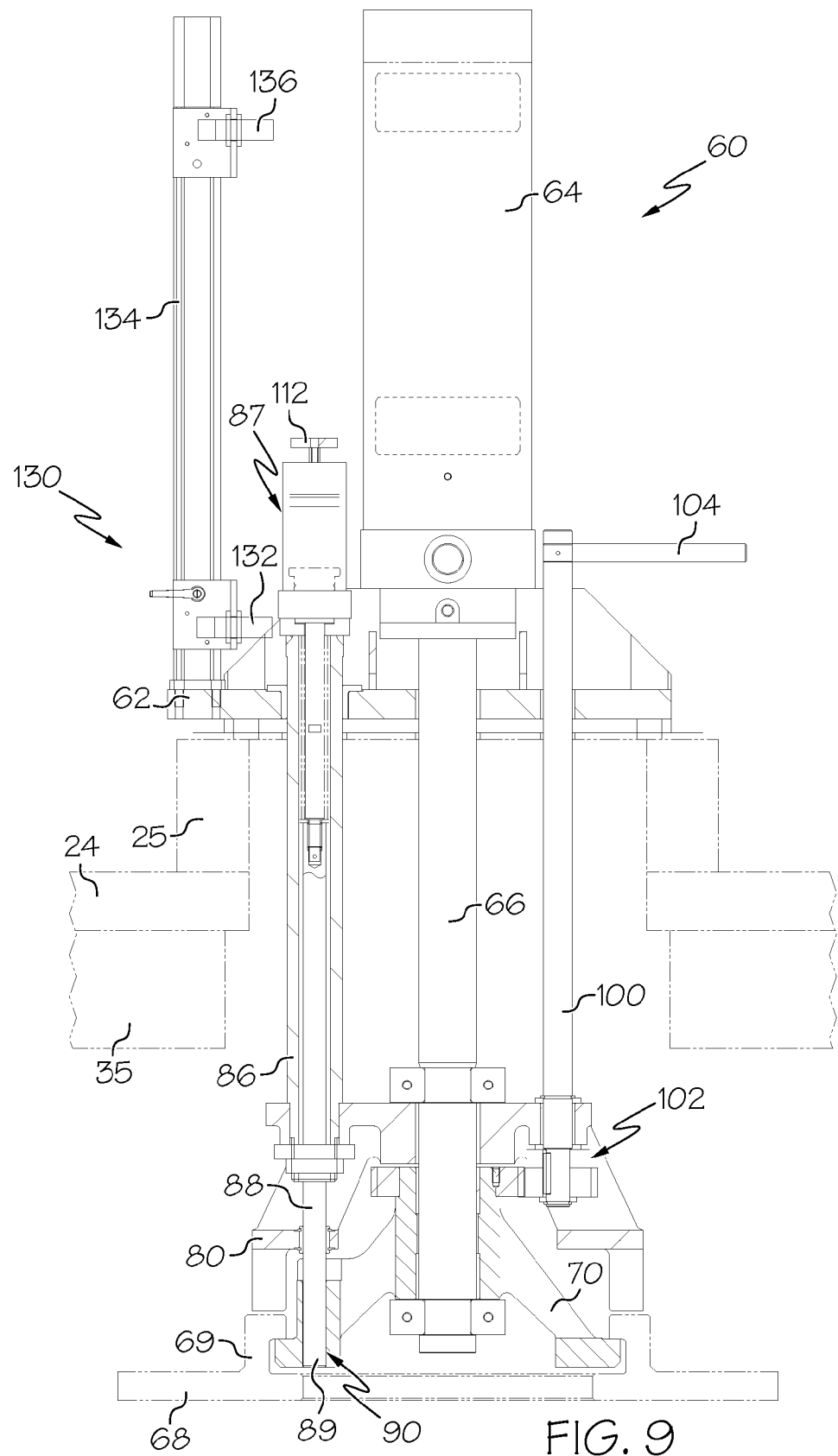
FIG. 9 is similar to FIG. 5, but shows the segmented mold operator in an extended condition.

Finally, turning to FIG. 9, the segmented mold operator is shown in an extended condition. For various purposes, the cylinder rod 66 of the control plunger 64 can be extended to adjust the position of the mold ring adapter 68 relative to the upper cavity part 24. It can be also beneficial to provide a visual and/or audible indication as to whether the cylinder rod 66 is in an extended or retracted condition. As described previously, the locking plunger 86 is axially movable together with extension and retraction of the main cylinder rod 66, and relative to the main frame 62 that is otherwise secured to the upper cavity part 24. One or more sensors can be provided to sense a position of the locking plunger 86, and therefore the extended or retracted condition the cylinder rod 66. In one example, a position sensor 130 is fixed to the main frame 62 that is configured to detect an axial position of the locking plunger 86 relative to the main frame 62.

Figure 5:
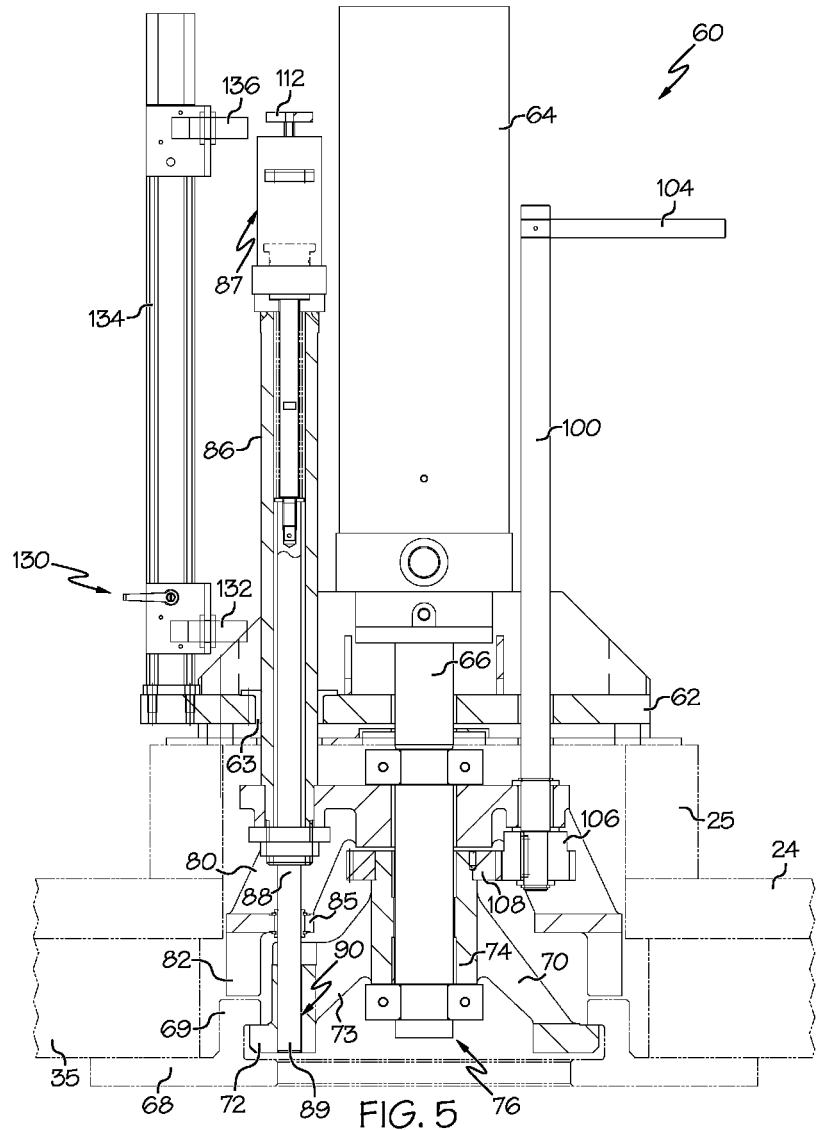
FIG. 5 is a partial sectional view of the segmented mold operator taken along line 5-5 of FIG. 3.

The position sensor 130 can include various types of contact or non-contact sensors to detect the locking plunger 86, such as any of the types previously described for the lock sensor 110. In the shown example, the position sensor 130 is a capacitive-type sensor that includes a plurality of detectors. Preferably, the position sensor 130 is capable of detecting at least two vertically spaced-apart positions of the locking plunger 86, and as such includes at least a pair of detectors including a lower detector 132 and an upper detector 136. The detectors 132, 136 can be directly or indirectly mounted to the main frame 62, such as on a riser column 134 that is mounted to the main frame 62. Of course, it is contemplated that the position sensor 130 could detect even more vertically spaced-apart positions of the locking plunger 86, and may include even more detectors. It is further contemplated that any or all of the detectors 132, 136 can be adjustably or non-adjustably mounted to the riser column 134. The detectors 132, 136 can be configured to sense when the upper portion 87 of the locking plunger 86 is adjacent. The detectors 132, 136 can be configured to directly sense the upper portion 87 itself, or a dedicated sensor target carried by the locking plunger 86. For example, FIG. 9 illustrates the cylinder rod 66 in the extended position with the upper portion 87 adjacent to the lower detector 132, while conversely FIG. 5 illustrates the cylinder rod 66 in the retracted position with the upper portion 87 adjacent to the upper detector 136. Finally, a visual and/or audible indication can be provided to show the vertical position of the locking plunger 86, which may be similar to that described above regarding the display 120. The indication may be visible to a user located near a base of the tire press cavity (e.g., a user standing on the factory floor), and/or may be provided or duplicated elsewhere. In addition or alternatively, the position sensor information is further provided to a system controller for the tire press.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A segmented mold operator, comprising:
 a main frame fixed to an upper cavity part of a tire press cavity;
 a control plunger with an axially movable cylinder rod that is configured to apply a squeeze pressure to said tire press cavity;
 a lock ring frame coupled to the cylinder rod and axially movable therewith; and
 a rotatable lock ring rotatably coupled about an end of the cylinder rod and axially movable therewith, the lock ring comprising a plurality of teeth radially arranged thereon to interface with a mold ring adapter via a bayonet connection;
 wherein the lock ring frame is independent from the rotatable lock ring and is separated therefrom along the cylinder rod.

2. The segmented mold operator of claim 1, wherein the rotatable lock ring is axially movable along the control plunger a distance relative to the lock ring frame.

3. The segmented mold operator of claim 2, wherein the rotatable lock ring is configured to apply a force to said mold ring adapter to thereby separate the mold ring adapter from the plurality of teeth of the rotatable lock ring.

4. The segmented mold operator of claim 1, wherein a locking plunger is fixed to the lock ring frame and includes a lock rod that is axially movable with respect to the rotatable lock ring.

5. The segmented mold operator of claim 4, wherein the rotatable lock ring further comprises a first hole extending therein to at least partially receive the lock rod and thereby prevent rotation of the rotatable lock ring.

6. The segmented mold operator of claim 5, wherein the rotatable lock ring further comprises a second hole extending therein to at least partially receive the lock rod, and wherein the second hole is radially offset from the first hole and has a depth relatively less than a depth of the first hole.

7. The segmented mold operator of claim 4, further comprising a lock sensor disposed at an upper portion of the locking plunger that is configured to sense an axial position of the lock rod.

8. The segmented mold operator of claim 7, further comprising a sensor target fixed to an upper portion of the lock rod and axially movable therewith, and wherein the lock sensor is configured to detect the sensor target.

9. The segmented mold operator of claim 8, wherein the lock sensor is capable of detecting at least two vertically spaced-apart positions of the sensor target.

10. The segmented mold operator of claim 8, wherein the lock sensor is a non-contact type that is configured to detect when the sensor target is physically adjacent to the sensor.

11. The segmented mold operator of claim 7, further comprising a display at an upper portion of the locking plunger that is visible to a user near a base of said tire press cavity to thereby provide a visual indication of the axial position of the lock rod.

12. The segmented mold operator of claim 4, wherein the locking plunger is axially movable together with the lock ring frame, and the segmented mold operator further comprises a position sensor fixed to the main frame that is configured to detect an axial position of the locking plunger relative to the main frame.

13. The segmented mold operator of claim 1, wherein the rotatable lock ring is rotatably driven about the cylinder rod by an actuator via a gear train.

14. A segmented mold operator, comprising:
 a main frame fixed to an upper cavity part of a tire press cavity;
 a control plunger with an axially movable cylinder rod that is configured to apply a squeeze pressure to said tire press cavity;
 a rotatable lock ring rotatably coupled about an end of the cylinder rod and axially movable therewith, wherein the rotatable lock ring is configured to rotatably interface with a mold ring adapter;
 a locking plunger including a lock rod that is axially movable with respect to the rotatable lock ring, wherein the locking plunger is configured to selectively engage the rotatable lock ring to thereby prevent rotation of the rotatable lock ring; and
 an electronic lock sensor disposed at an upper portion of the locking plunger that is configured to electronically sense an axial position of the lock rod relative to the locking plunger.

15. The segmented mold operator of claim 14, further comprising a sensor target fixed to an upper portion of the lock rod and axially movable therewith, and wherein the electronic lock sensor is configured to detect the sensor target.

16. The segmented mold operator of claim 15, wherein the electronic lock sensor is capable of detecting at least two vertically spaced-apart positions of the sensor target.

17. The segmented mold operator of claim 14, wherein the electronic lock sensor is a non-contact type that is configured to detect when the sensor target is physically adjacent to the sensor.

18. The segmented mold operator of claim 14, wherein the rotatable lock ring further comprises first and second holes extending therein that can each at least partially receive the lock rod to thereby prevent rotation of the rotatable lock ring, and wherein the second hole is radially offset from the first hole and has a depth relatively less than a depth of the first hole.

19. The segmented mold operator of claim 18, wherein the electronic lock sensor is configured to detect whether the lock rod is received into either the first hole or the second hole of the rotatable lock ring.

20. The segmented mold operator of claim 14, further comprising a lock ring frame coupled to the cylinder rod and axially movable therewith,
   wherein the lock ring frame is independent from the rotatable lock ring and is separated therefrom along the cylinder rod, and
   wherein the locking plunger is fixed to the lock ring frame.

* * * * *